United States Patent [19]

Savage et al.

[11] Patent Number: 4,636,731
[45] Date of Patent: Jan. 13, 1987

[54] PROPAGATION ANISOTROPIC WELL LOGGING SYSTEM AND METHOD

[75] Inventors: Kerry D. Savage; Percy T. Cox; Hans J. Paap, all of Houston, Tex.

[73] Assignee: Texaco Inc., White Plains, N.Y.

[21] Appl. No.: 688,106

[22] Filed: Dec. 31, 1984

[51] Int. Cl.⁴ ............................................. G01V 3/30
[52] U.S. Cl. ................................... 324/338; 324/343
[58] Field of Search ................ 324/338, 339, 341, 343

[56] References Cited

U.S. PATENT DOCUMENTS

| | | | |
|---|---|---|---|
| 2,790,138 | 4/1957 | Poupon | 324/339 |
| 3,187,252 | 6/1965 | Hungerford | 324/343 |
| 4,107,598 | 8/1978 | Meador et al. | 324/341 |
| 4,427,941 | 10/1984 | Riedesel, Jr. et al. | 324/338 X |

FOREIGN PATENT DOCUMENTS

| | | | |
|---|---|---|---|
| 374565 | 6/1973 | U.S.S.R. | 324/338 |
| 648928 | 2/1979 | U.S.S.R. | 324/339 |

*Primary Examiner*—Gerard R. Strecker
*Attorney, Agent, or Firm*—Robert A. Kulason; James J. O'Loughlin; Ronald G. Gillespie

[57] ABSTRACT

An anisotropic well logging system includes a well logging tool including a first transmitter coil spatially arranged within the well logging tool in a first predetermined manner and a second transmitter coil spatially arranged within the well logging tool in a second predetermined manner which ultimately transmits electromagnetic energy into the formation at a frequency which enables electromagnetic energy to propagate through the surrounding earth formation. A first pair of receiver coils spaced a predetermined distance from each other and from the first transmitter coil and spatially arranged within the well logging tool in the same manner as the first transmitter coil provides signals in accordance with the received electromagnetic energy. A second pair of receiver coils spatially arranged within the logging tool in the same predetermined manner as the second transmitter coil and spaced a predetermined distance from each other and another predetermined distance from the second transmitter coil provides signals in accordance with the received electromagnetic energy. A control apparatus controls the first and second transmitters so they alternately transmit the electromagnetic energy into the earth formation and also provides a control signal. Processing apparatus responsive to the control signal from the control apparatus provides one output representative of the vertical resistance of the earth formation and a second output representative of the horizontal resistance of the earth formation in accordance with the signals from the four receivers.

22 Claims, 2 Drawing Figures

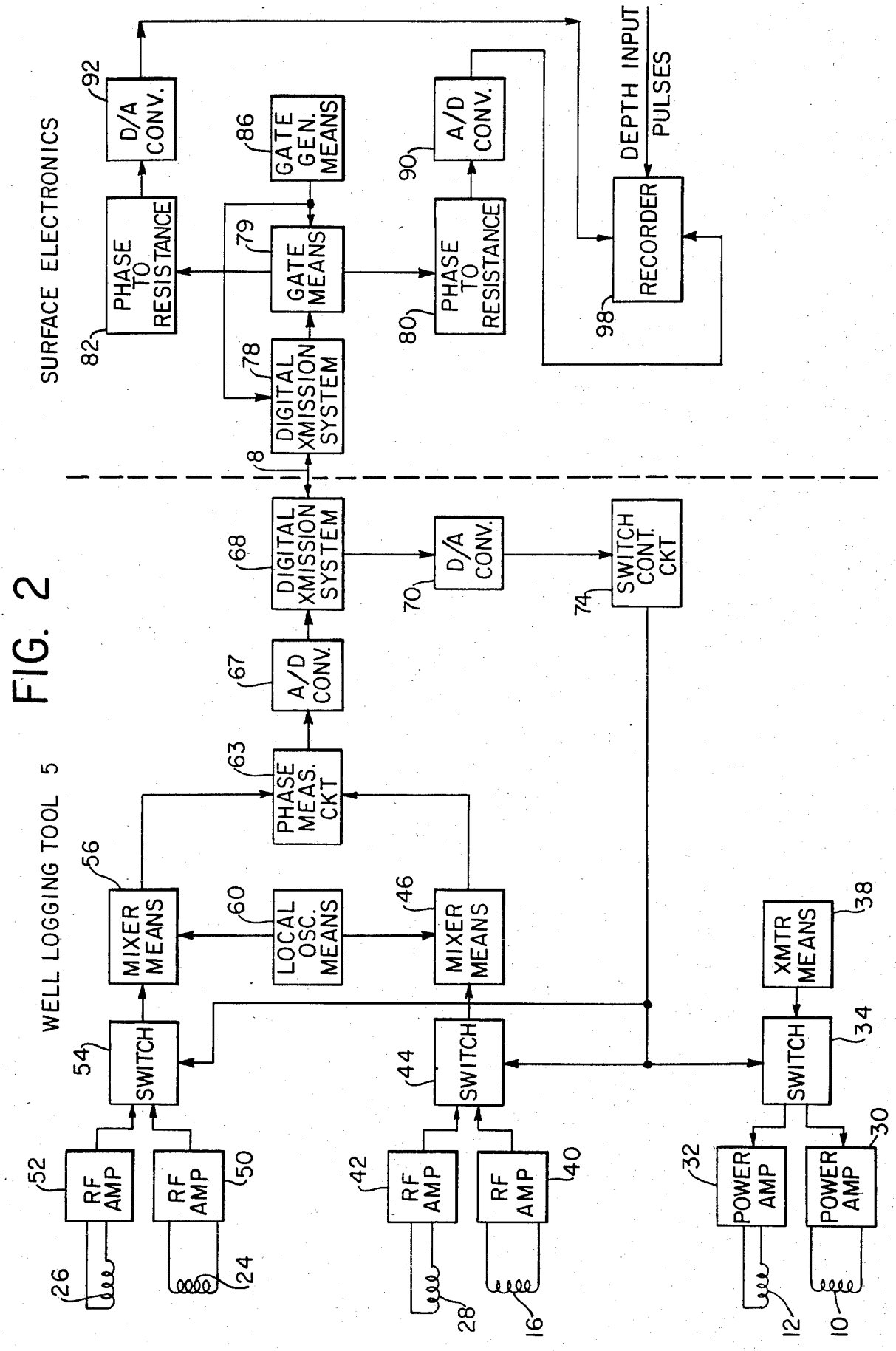

PROPAGATION ANISOTROPIC WELL LOGGING SYSTEM AND METHOD

BACKGROUND OF THE INVENTION

FIELD OF THE INVENTION

The present invention relates to resistivity well logging systems and methods in general and, more particularly, to resistivity well logging systems and methods for the detection of anisotropic earth formations.

SUMMARY OF THE INVENTION

An anisotropic well logging system includes a well logging tool including a first transmitter coil spatially arranged within the well logging tool in a first predetermined manner and a second transmitter coil spatially arranged within the well logging tool in a second predetermined manner which ultimately transmits electromagnetic energy into the formation at a frequency which enables electromagnetic energy to propagate through the surrounding earth formation. A first pair of receiver coils spaced a predetermined distance from each other and from the first transmitter coil and spatially arranged within the well logging tool in the same manner as the first transmitter coil provides signals in accordance with the recieved electromagnetic energy. A second pair of receiver coils spatially arranged within the logging tool in the same predetermined manner as the second transmitter coil and spaced a predetermined distance from each other and another predetermined distance from the second transmitter coil provides signals in accordance with the received electromagnetic energy. A control apparatus controls the first and second transmitters so they alternately transmit the electromagnetic energy into the earth formation and also provides a control signal. Processing apparatus responsive to the control signal from the control apparatus provides one output representative of the vertical resistance of the earth formation and a second output representative of the horizontal reistance of the earth formation in accordance with the signals from the four receivers.

The objects and advantages of the invention will appear more fully hereinafter toward consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 2 is a schematic of an anisotropic well logging system constructed in accordance with the present invention.

DESCRIPTION OF THE PREFERRED EMBODIMENT

Figure 1:
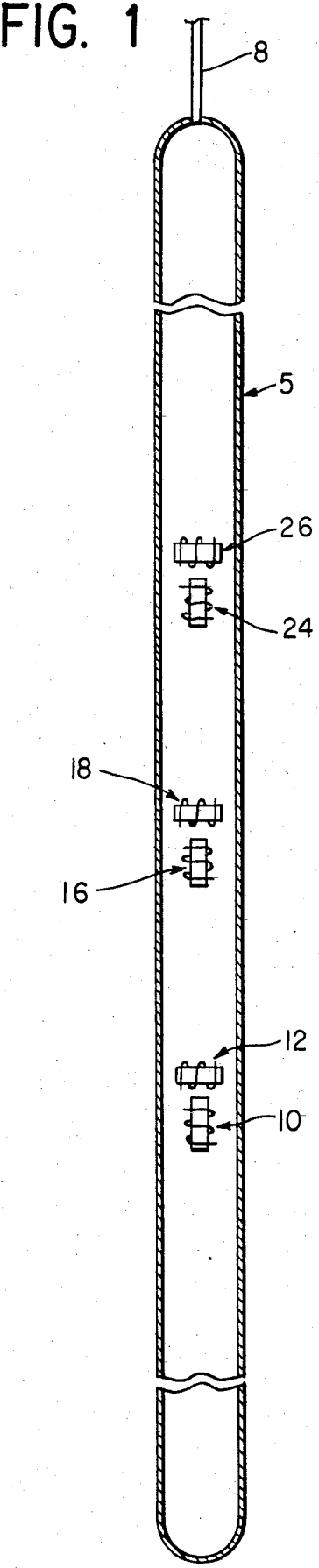
FIG. 1 is a graphical representation of an anisotropic well logging tool constructed in accordance with the present invention.

Referring now to FIG. 1, there is shown a well logging tool 5 connected to a logging cable 8 with the coil arrangement in the present invention for anistropy well logging. In this regard, there is a transmitter coil 10 having a common longitudinal axis with logging tool 5. There is also a second transmitter coil 12 whose longitudinal axis is perpendicular to the longitudinal axis of well logging tool 5. There are two receiver coils 16 and 24 having a common longitudinal axis with the longitudinal axis of the well logging tool spaced a predetermined distance from each other. Coils 16 and 24 are spaced predetermined distances from transmitter coil 10. Similarly there are reciever coils 18 and 26 whose longitudinal axes are not common to each other, but are perpendicular to the longitudinal axis of logging tool 5.

With reference to FIG. 2, coils 10, 12, 16, 18, 24 and 26 are shown in schematic form with coils 10 and 12 being connected to power amplifiers 30 and 32 respectively. Power amplifiers 30 and 32 are in turn connected to an electronic switch 34 which is in essence is a single pole, double throw switch controlled by a signal as hereinafter explained. Switch 34 is also connected to a transmitter means 38 which provides the electromagnetic energy to be transmitted into the earth formation by coils 10 and 12. The frequency of the electromagnetic energy may be in the range of 0.5 to 4 megahertz. A preferred frequency has been found to be 2 megahertz.

Coils 16 and 18 are connected to RF amplifiers 40 and 42, respectively, whose outputs are connected to another single pole double throw electronic switch 44. Switch 44 is also responsive to the same control signal as switch 34. Switch 44 is connected to mixer means 46.

Similarly coils 24, 26 are connected to RF amplifiers 50 and 52, respectively, whose outputs in turn are connected to yet another single pole double throw electronic switch 54. Switch 54 is controlled by the same control signal previously mentioned. Switch 54 is connectd to mixer means 56.

A local oscillator 60 provides a signal to mixer means 46 and 56, each of which produces a lower frequency, preferably 2 kilohertz, output to a phase measuring circuit 63. The output from phase measuring circuit 63 is provided to an analog-to-digital converter 67 which in turn is connected to a digital transmission system 68. Digital transmission system 68 is connected to well logging cable 8 and also to a digital-to-analog converter 70. Digital-to-analog convertor 70 provides a gate output signal from the surface electronics unit to switch control circuit 74, which in turn provides the control signal to switches 34, 44 and 54.

Well logging cable 8 is connected to the surface electronics and more specifically to the surface digital transmission system 78. The output of the digital transmission system 78 is also provided back downhole to digital transmission system 68 as hereinafter explained. Another output of digital transmission system 78 is provided to gate means 79 which in essence is a single pole, double throw electronic switch providing outputs to phase-to-resistivity converters 80 and 82, as hereinafter explained. Phase-to-resistivity converters 80, 82 are EPROM memories, containing stored resistivity values associated with different phase measurements. Gate means 79 is controlled by a control signal from gate generator means 86, which also provides the control signal to digital transmission system 78 for transmission downhole to switch control circuit 74. The outputs of phase-to-resistivity means 80, 82 are provided to digital-to-analog converters 90 and 92, respectively, which converts the outputs to analog signals and provides them to a conventional recorder 98. There is also a depth signal being received by recorder 98 from the sheave wheel, which is used in the raising and lowering operation of the well logging tool. The recordings being provided by recorder 98 are correlated to depth in the borehole.

In operation, gate generator means 96 repetitiously provides control pulses to digital transmission system 78 and gate means 79. The control pulses are then transmitted downhole where they are separated by digital transmission system 68 and provided to digital-to-analog converter 70. The digital signals are converted to an analog signal which in turn are processed into a control signal by switch control circuit 74. The control signal from switch control circuit 74 causes switches 34, 44 and 54 to alternately switch between transmitter coils 10 and 12 and receiver coils 16 and 18 and receiver coils 24 and 26, respectively. Thus when the electromagnetic energy from transmitter means 38 is being provided to transmitting coil 10 the electromagnetic energy being received by receiver coils 16 and 24 passes through switches 44 and 54, respectively to mixer means 46 and 56, respectively where they are mixed with the signals from local oscillator means 60.

Phase measurement circuit 63 provides a phase measurement signal, associated only with the longitudinal axis of well logging tool 5, to analog-to-digital converter 67 for conversion to digital signals. The digital signals are transmitted uphole to the digital transmission system 78, which in turn provides them to gate means 79.

Gate means 79 is also controlled by gate generator means 86, and passes the digital to phase data to phase-to-resistivity means 80. Phase-to-resistivity means 80 then selects the appropriate resistivity value in accordance with the digital signals and provides corresponding digital signals to a digital-to-analog converter 90 where they are converted to an analog signal. The analog signal from converter 90 is recorded by recorder 98 as the axial resistivity for the earth formation with the term "axial" identifying the orientation of the measurement coils. Actually, the resistivity measured by these coils is predominantly in the plane perpendicular to the axis of the well logging tool.

Similarly gate generator means 86 will then cause switch control circuit 74 not to provide a control signal and as a result transmitter means 38 provides it electromagnetic energy to transmitter coil 12 which is transmitted into the earth formation. This time, however, radially oriented energy propagates through the earth formation and is detected by receiver coils 18 and 26. Coils 18 and 26 provide signals which are passed through switches 44 and 54, respectively, to mixer means 46 and 56, so that the phase measurement from phase measuring circuit 63 at this time corresponds to the phase measurement for the radial resistivity of the earth formation. It should be noted that the term "radial" identifies the orientation of the measurement coils. Actually, the resistivity measured by these coils is predominantly in a plane parallel to the axis of the well logging sonde. The signal from phase measuring circuit 63 is processed by analog-to-digital converter 67 and digital transmission system 68 which then transmits the signal uphole to digital transmission system 78 and thence through gate means 79, to phase-to-resistivity means 82, and then to digital-to-analog converter 92 where the digital signals are converted to an analog signal representative of the radial resistivity of the earth formation, which is recorded by recorder 98.

It may be desirable to record the resistivity anisotropy factor as the ratio of the axial resistivity to the radial resistivity. In such case the ratio would be taken in digital form with the outputs signals from 80 and 82. Output of the ratio circuit would then be converted to analog for recording.

What is claimed is:

1. Apparatus for determining the anisotropy of an earth formation by measuring both vertical and horizontal resistivity of the formation in the vicinity of a borehole traversing the earth formation comprising:

first transmitter means located in the borehole and spatially arranged with the earth formation in a first predetermined manner for transmitting electromagnetic energy into the earth formation at a frequency within a frequency range from 0.5 MHz to 4 MHz, second transmitter means located in the borehole and spatially arranged with the earth formation in a second predetermined manner for transmitting electromagnetic energy into the earth formation at a frequency within a frequency from 0.5 MHz to 4 MHz, first receiving means spatially arranged with the earth formation in the first predetermined manner and spaced a first predetermined distance from the first transmitter means for receiving electromagnetic energy from the earth formation and providing a corresponding signal, second receiving means spatially arranged with the earth formation in the first predetermined manner and spaced a second predetermined distance from the first receiving means for receiving electromagnetic energy from the earth formation and providing a corresponding signal, third respective means spatially arranged with the earth formation in the second predetermined manner and spaced the first predetermined distance from the second transmitter means for receiving electromagnetic energy and providing a corresponding signal, fourth receiving means spatially arranged with the earth formation in the second predetermined manner and spaced a predetermined distance from the third receiving means for receiving electromagnetic energy and providing a corresponding signal, control means connected to the first and second transmitter means for causing the first and second transmitter means to alternately transmit the electromagnetic energy into the earth formation and for providing a control signal, and means connected to the first, second, third and fourth receiving means and to the control means for providing one output signal representative of the vertical resistance of the earth formation and a second output signal representative of the horizontal resistance of the earth formation in accordance with the signals from all the receiving means and the control signal from the control means.

2. Apparatus as described in claim 1 in which:

the first transmitter means is a transmitter coil oriented in such a manner that its longitudinal axis lies in a vertical plane of the earth formation, the second transmitter means is a transmitter coil arranged so that its longitudinal axis lies in a horizontal plane of the earth formation, the first and second receiving means are receiver coils arranged so that their longitudinal axis lies in a vertical plane of the earth formation, and the third and fourth receiving means are receiver coils arranged so that their longitudinal axis of the coils lies in horizontal planes of the earth formation.

3. Apparatus as described in claim 2 in which the control means includes:
means for energizing the transmitter coils to cause the transmitter coils when so energized to transmit electromagnetic energy into the earth formation, and
switching means connecting the transmitter coils to the energizing means and connected to all the receiver coils for alternately energizing the transmitter coils and for alternately passing the signals from the first and second receiver coils and from the third and fourth receiver coils so that when the first transmitter coil is energized the signals from the first and second receiver coils are passed and when the second transmitter coil is energized the signals from the third and fourth receiver coils are passed.

4. Apparatus as described in claim 3 in which the output means includes:
local oscillator means for providing a local oscillator signal,
a pair of mixing means for mixing received signals passed by the switching means with the local oscillator signal, one mixing means receiving the passed signal provided by either the first or the third receiver coil and the other mixing means receiving the passed signal by either the second or the fourth receiver coil,
phase means connected to both mixing means for providing a phase signal in accordance with the signals from both mixing means, and
circuit means connected to the phase means for providing the first output signal representative of the vertical resistance of the earth formation and the second output signal representative of the horizontal resistance of the earth formation in accordance with the phase signal from the phase means.

5. Apparatus as described in claim 4 in which the circuit means includes:
gate generator means for providing a gate signal connected to the control means,
gate means responsive to the gate signal from the gate generator means and connected to the phase means for separating the phase signal so that those portions of the phase signal related to the first and second receiver coils are provided as a first signal and those portions of phase signal related to the third and fourth receiver coils are provided as a second signal,
a pair of means connected to the gate means for converting each phase signal from the gate means to a resistivity signal.

6. A well logging system for determining the vertical resistivity and the horizontal resistivity of earth formations traversed by a borehole comprising:
a well logging sonde adapted to be passed through the borehole including:
first transmitter means spatially arranged within the sonde in a first predetermined manner for transmitting electromagnetic energy into the earth formation at a frequency within a frequency range from 0.5 MHz to 5 MHz,
second transmitter means spatially arranged within the sonde in a second predetermined manner for transmitting electromagnetic energy into the earth formation at a frequency within a frequency range from 0.5 MHz to 4 MHz,
first receiving means spatially arranged within the sonde in the first predetermined manner and spaced a first predetermined distance from the first transmitting means for receiving electromagnetic energy from the earth formation and providing a corresponding signal,
second receiving means spatially arranged within the sonde in the first predetermined manner and spaced a second predetermined distance from the first receiving means for receiving electromagnetic energy from the earth formation and providing a corresponding signal,
third receiving means spatially arranged within the sonde in the second predetermined manner and spaced the first predetermined distance from the second transmitting means for receiving electromagnetic energy and providing a corresponding signal,
fourth receiving means spatially arranged within the sonde in the second predetermined manner and spaced a predetermined distance from the third receiving means for receiving electromagnetic energy and providing a corresponding signal,
energizing means receiving a control signal and connected to the first and second transmitter means for causing the first and second transmitter means to alternately transmit the electromagnetic energy into the earth formation in accordance with a control signal, and
first switching means receiving the control signal and connected to the first, second, third and fourth receiving means for providing one output representative of electromagnetic energy received by the first receiver means or the third receiver means and a second output representative of electromagnetic energy received by the second receiver means or the fourth receiver means, and
first processing means connected to the first switching means for processing the two output signals from the switching means to provide a signal for application to well logging cable means and for deriving the control signal from a signal provided by the well logging cable means;
well logging cable means connected to said processing means for conveying the signal from the processing means out of borehole and for conveying a signal representative of the control signal from the surface to the sonde; and
surface electronics including:
control signal means for providing the control signal,
second processing means connected to the well logging cable means and to the control signal means for processing the signal from the well logging cable means to two signals, one signal related to the horizontal resistivity and the other signal being related to the vertical resistivity and for processing the signal for conveyance by the well logging cable means to the sonde, and
means connected to the second processing means for providing an indication of the vertical resistivity and the horizontal resistivity of the anisotropic earth formation.

7. A system as described in claim 6 in which:
the first transmitter means is a transmitter coil oriented in such a manner that its longitudinal axis lies in a vertical plane of the earth formation, the second transmitter means is a transmitter coil arranged so that its longitudinal axis lies in a horizontal plane of the earth formation, the first and second receiving means are receiver coils arranged so that their longitudinal axis lies in a vertical plane of the earth formation, and the third and fourth receiving means are receiver coils arranged so that their longitudinal axis of the coils lies in horizontal planes of the earth formation.

8. A system as described in claim 7 in which the energizing means includes:

power means for energizing the transmitter coils to cause the transmitter coils when so energized to transmit electromagnetic energy into the earth formation, and second switching means connecting the transmitter coils to the power means and connected to all the receiver coils and to the first processing means for alternately energizing the transmitter coils and for alternately passing the signals from the first and second receiver coils and from the third and fourth receiver coils so that when the first transmitter coil is energized the signals from the first and second receiver coils are passed and when the second transmitter coil is energized the signals from the third and fourth receiver coils are passed, in accordance with the control signal from the first processing means.

9. A system as described in claim 8 in which the first processing means includes:

local oscillator means for providing a local oscillator signal, a pair of mixing means for mixing received signals passed by the switching means with the local oscillator signal, one mixing means receiving the passed signal provided by either the first or the third receiver coil and the other mixing means receiving the passed signal by either the second or the fourth receiver coil, and phase means connected to both mixing means for providing a phase signal suitable for conveyance by the well logging cable means in accordance with the signals from both mixing means.

10. A system as described in claim 9 in which the second processing means includes:

gate means responsive to the control signal from the control signal means and connected to the well logging cable separating the phase signal so that those portions of the phase signal related to the first and second receiver coils are provided as a first signal and those portions of phase signal related to the third and fourth receiver coils are provided as a second signal, a pair of means for converting each signal from the gate means to a resistivity signal connected to the gate means and to the indication means, said resistivity signals being provided to the indication means.

11. A method for determining the vertical resistivity and the horizontal resistivity of an anisotropic earth formation in the vicinity of a borehole traversing the earth formation comprising:

transmitting electromagnetic energy into the earth formation at a frequency within a frequency range from 0.5 MHz to 4 MHz with a first transmitter located in the borehole and spatially arranged with the earth formation in a first predetermined manner, transmitting electromagnetic energy into the earth formation at a frequency within a frequency range from 0.5 MHz to 4 MHz with a second transmitter located in the borehole and spatially arranged with the earth formation in a second predetermined manner, receiving electromagnetic energy from the earth formation and providing a corresponding signal with a first receiver spatially arranged with the earth formation in the first predetermined manner and spaced a first predetermined distance from the first transmitter, receiving electromagnetic energy from the earth formation and providing a corresponding signal with a second receiver spatially arranged with the earth formation in the first predetermined manner and spaced a second predetermined distance from the first receiver, receiving electromagnetic energy and providing a corresponding signal with a third receiver spatially arranged with the earth formation in the second predetermined manner and spaced the first predetermined distance from the second transmitter, receiving electromagnetic energy and providing a corresponding signal with a fourth receiver spatially arranged with the earth formation in the second predetermined manner and spaced a predetermined distance from the third receiver causing the first and second transmitters to alternately transmit the electromagnetic energy into the earth formation, providing a control signal, and providing one output representative of the vertical resistance of the earth formation and a second output signal representative of the horizontal resistance of the earth formation in accordance with the signals from all the receivers and the control signal.

12. A method as described in claim 11 in which:

the first transmitter is a transmitter coil oriented in such a manner that its longitudinal axis lies in a vertical plane of the earth formation, the second transmitter is a transmitter coil arranged so that its longitudinal axis lies in a horizontal plane of the earth formation, the first and second receiving means are receiver coils arranged so that their longitudinal axis lies in a vertical plane of the earth formation, and the third and fourth receiving means are receiver coils arranged so that their longitudinal axis of the coils lies in horizontal planes of the earth formation.

13. A method as described in claim 12 in which the causing step includes:

alternately energizing the transmitter coils to cause the transmitter coils when so energized to transmit electromagnetic energy into the earth formation.

14. A method as described in claim 13 further comprising the step of:

alternately passing the signals from the first and second receiver coils and from the third and fourth receiver coils in cooperation with the energization of the transmitter coils so that when the first transmitter coil is energized the signals from the first and second receiver coils are passed and when the second transmitter coil is energized the signals from the third and fourth receiver coils are passed.

15. A method as described in claim 14 in which the output providing step includes:
- providing a local oscillator signal,
- mixing passed signals from the receiver coils with the local oscillator signal to provide two mixed signals, one mixed signal being associated with the first and second receiver coils, the other mixed signal being associated with the third and fourth receiver coils,
- providing a phase signal in accordance with both mixed signals, and
- providing the first output signal representative of the vertical resistance of the earth formation and the second output signal representative of the horizontal resistance of the earth formation in accordance with the phase signal.

16. A method as described in claim 15 in which the output signal providing step includes:
- providing a gate signal synchronized with the energization of the transmitter coils,
- separating the phase signal with a gate in accordance with the gate signal so that those portions of the phase signal related to the first and second receiver coils are provided as a first gated phase signal and those portions of phase signal related to the third and fourth receiver coils are provided as a second gated phase signal,
- converting each phase gated signal to a resistivity signal.

17. A well logging method for determining the vertical resistivity and the horizontal resistivity of earth formations, some of which have been invaded by drilling fluid, traversed by a borehole comprising the steps:
- transmitting electromagnetic energy into the earth formation at a frequency within a frequency range from 0.5 MHz to 4 MHz with a first transmitter spatially arranged within a well logging sonde in a first predetermined manner,
- transmitting electromagnetic energy into the earth formation at a frequency within a frequency range from 0.5 MHz to 4 MHz with a second transmitter spatially arranged within the sonde in a second predetermined manner,
- receiving electromagnetic energy from the earth formation and providing a corresponding signal with a first receiver spatially arranged within the sonde in the first predetermined manner and spaced a first predetermined distance from the first transmitter,
- receiving electromagnetic energy from the earth formation and providing a corresponding signal with a second receiver spatially arranged within the sonde in the first predetermined manner and spaced a second predetermined distance from the first receiver,
- receiving electromagnetic energy and providing a corresponding signal with a third receiver spatially arranged within the sonde in the second predetermined manner and spaced the first predetermined distance from the second transmitter,
- receiving electromagnetic energy and providing a corresponding signal with a fourth receiver spatially arranged within the sonde in the second predetermined manner and spaced a predetermined distance from the third receiver,
- causing the first and second transmitters to alternately transmit the electromagnetic energy into the earth formation, and
- providing within the sonde one output signal representative of electromagnetic energy received by the first receiver or the third receiver,
- providing within the sonde a second output signal representative of electromagnetic energy received by the second receiver or the fourth receiver,
- processing the two output signals within the sonde to provide for application to a well logging cable,
- conveying the processed signal out of borehole,
- processing the signal at the surface from the well logging cable to provide two signals, one signal related to the horizontal resistivity of the anisotropic earth formation and the other signal being related to the vertical resistivity of the anisotropic earth formation,
- providing an indication of the vertical resistivity and the horizontal resistivity of the anisotropic earth formation in accordance with the signals provided by the surface processing step.

18. A method as described in claim 17 in which:
- the first transmitter is a transmitter coil oriented in such a manner that its longitudinal axis lies in a vertical plane of the earth formation,
- the second transmitter is a transmitter coil arranged so that its longitudinal axis lies in a horizontal plane of the earth formation,
- the first and second receivers are receiver coils arranged so that their longitudinal axis lies in a vertical plane of the earth formation, and
- the third and fourth receivers are receiver coils arranged so that their longitudinal axis of the coils lies in horizontal planes of the earth formation.

19. A method as described in claim 18 in which the causing step includes:
- energizing the transmitter coils to cause the transmitter coils when so energized to transmit electromagnetic energy into the earth formation.

20. A method as described in claim 19 further comprising the step of alternately passing the signals from the first and second receiver coils and from the third and fourth receiver coils in cooperation with the energization of the transmitter coils so that when the first transmitter coil is energized the signals from the first and second receiver coils are passed and when the second transmitter coil is energized the signals from the third and fourth receiver coils are passed.

21. A method as described in claim 20 in which the sonde processing step includes:
- providing a local oscillator signal,
- mixing passed signals from the receiver coils with the local oscillator signal to provide two mixed signals, one mixed signal being associated with the first and second receiver coils and the other mixed signal being associated with the third and fourth receiver coils, and
- providing a phase signal suitable for conveyance by the well logging cable in accordance with both mixed signals.

22. A method as described in claim 21 in which the surface processing step includes:
- separating the phase signal so that those portions of the phase signal related to the first and second receiver coils are provided as a first signal and those portions of phase signal related to the third and fourth receiver coils are provided as a second signal,
- converting each signal provided by the separating step to a resistivity signal, one resistivity signal being representative of the horizontal resistivity of the anisotropic earth formation and the other resistivity signal being representative of the vertical resistivity of the anisotropic earth formation.

* * * * *